(12) United States Patent
Ishii et al.

(10) Patent No.: US 12,344,234 B2
(45) Date of Patent: Jul. 1, 2025

(54) DRIVING SUPPORT DEVICE, DRIVING SUPPORT METHOD, AND DRIVING SUPPORT PROGRAM

(71) Applicant: TOYOTA JIDOSHA KABUSHIKI KAISHA, Toyota (JP)

(72) Inventors: Ryo Ishii, Toyota (JP); Takuya Kaminade, Okazaki (JP); Naoya Matsunaga, Nagoya (JP); Masashi Oishi, Owariasahi (JP); Masaki Ikai, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 140 days.

(21) Appl. No.: 18/358,196

(22) Filed: Jul. 25, 2023

(65) Prior Publication Data
US 2024/0092346 A1 Mar. 21, 2024

(30) Foreign Application Priority Data
Sep. 15, 2022 (JP) .................. 2022-146948

(51) Int. Cl.
*B60W 30/06* (2006.01)
*B60W 50/00* (2006.01)
*B60W 50/12* (2012.01)

(52) U.S. Cl.
CPC ........ *B60W 30/06* (2013.01); *B60W 50/0097* (2013.01); *B60W 50/12* (2013.01);
(Continued)

(58) Field of Classification Search
CPC .. B60W 30/06; B60W 50/0097; B60W 50/12; B60W 2520/00; B60W 2540/10;
(Continued)

(56) References Cited

U.S. PATENT DOCUMENTS 8,847,786 B2 * 9/2014 Bandou .................. G08G 1/166
340/901
11,001,255 B2 5/2021 Fukuman et al.
(Continued)

FOREIGN PATENT DOCUMENTS

JP 2001107594 A * 4/2001
JP 2021-049981 A 4/2021
JP 2023-154553 A 10/2023

OTHER PUBLICATIONS

Matsuda et al. (JP2001107594A); Device and Method for Assisting Parking; Yazaki Corp; Toshiba Corp + (Yazaki Corp, ; TOSHIBACORP) (Year: 2001).*

*Primary Examiner* — B M M Hannan
(74) *Attorney, Agent, or Firm* — Sughrue Mion, PLLC (57) ABSTRACT

Provided is a driving support device (1) including a control device which has an acceleration suppression function of suppressing acceleration of an own vehicle when the own vehicle is determined to be positioned in a parking area (PA) including a parking spot row (PSA) and an erroneous depression operation is determined to be executed on an accelerator pedal (AP). The control device predicts a trajectory (T) of the own vehicle in a case in which the own vehicle travels when a speed (vs) of the own vehicle is equal to or higher than a predetermined speed, and further predicts a time (Δt) required for the own vehicle to reach a point at which the trajectory (T) and the parking spot row (PSA) intersect with each other. The control device determines that the own vehicle is positioned in the parking area (PA) when the predicted time (Δt) is equal to or shorter than a predetermined time. When the speed (vs) of the own vehicle is lower than the predetermined speed or the own vehicle is stopped, the control device determines that the own vehicle is positioned in the parking area (PA) in a case in which a determination target region (A0), which has a predetermined (Continued)

length, extends from the own vehicle toward a traveling direction, and is defined in accordance with a turning angle of the own vehicle, and the parking spot row (PSA) overlap each other.

4 Claims, 6 Drawing Sheets

(52) U.S. Cl.
CPC ..... *B60W 2520/00* (2013.01); *B60W 2540/10* (2013.01); *B60W 2540/18* (2013.01)

(58) Field of Classification Search
CPC .. B60W 2540/18; B60W 40/02; B60W 50/08; B60W 50/10; B60W 50/087; B60W 2520/10
USPC .......................................................... 701/23
See application file for complete search history.

(56) References Cited

U.S. PATENT DOCUMENTS

| | | | | |
|---|---|---|---|---|
| 2005/0086000 | A1* | 4/2005 | Tsuchiya | ................ G08G 1/166 |
| | | | | 701/538 |
| 2018/0105208 | A1* | 4/2018 | Kim | ..................... G05D 1/0061 |
| 2020/0005649 | A1* | 1/2020 | Kim | ..................... B62D 15/028 |
| 2020/0361455 | A1* | 11/2020 | Murakami | ............ B60W 50/14 |
| 2021/0039665 | A1 | 2/2021 | Kaminade et al. | |
| 2021/0402996 | A1* | 12/2021 | Wang | ................. B60W 40/105 |

\* cited by examiner

DRIVING SUPPORT DEVICE, DRIVING SUPPORT METHOD, AND DRIVING SUPPORT PROGRAM

BACKGROUND OF THE INVENTION

1. Field of the Invention

The present invention relates to a driving support device, a driving support method, and a driving support program which suppress acceleration of an own vehicle when a driver has highly possibly erroneously depressed an accelerator pedal.

2. Description of the Related Art

There has been proposed a driving support device having an acceleration suppression function of suppressing acceleration of an own vehicle when a driver has highly possibly erroneously depressed an accelerator pedal (for example, see Japanese Patent Application Laid-open No. 2021-49981). The driving support device as described in Japanese Patent Application Laid-open No. 2021-49981 (hereinafter referred to as "related-art device") determines that the driver has erroneously depressed the accelerator pedal when, for example, an increase rate (an increase amount per unit time) of a depression depth of the accelerator pedal exceeds a threshold value. In this case, the related-art device executes acceleration suppression control, to thereby control a drive device, a braking device, and the like of the own vehicle such that the own vehicle does not accelerate.

When, for example, the driver has erroneously depressed the accelerator pedal deeply while the driver is executing a driving operation of parking an own vehicle in one parking spot in a parking area including a parking spot row in which parking spots are arranged in parallel, safety of the own vehicle can be increased in a case in which the acceleration of the own vehicle is suppressed by the acceleration suppression function. Meanwhile, when, for example, the driver has intentionally depressed the accelerator pedal in order to pass a preceding vehicle, but the acceleration of the own vehicle is suppressed by the acceleration suppression function, the driver is sometimes bothered by this acceleration suppression.

SUMMARY OF THE INVENTION

One object of the present invention is to provide an driving support device capable of reducing a sense of discomfort of a driver by reducing acceleration suppression unnecessary for the driver.

In order to achieve the above-mentioned object, according to at least one embodiment of the present invention, there is provided a driving support device (1) including: an operation sensor (23, 24, 25, 26, 27) configured to acquire operation information (AD, BD, ADR, SP, θ) that is information on an operation on a driving operation device (AB, BP, SL, DI, SW) included in an own vehicle (V); a vehicle sensor (22) configured to acquire vehicle information (vs) that is information on a travel state of the own vehicle; a periphery sensor (21) configured to acquire peripheral information that is information on a target object existing in a periphery of the own vehicle; and a control device (an electronic control unit (ECU) 10). The control device has a parking area determination function of determining, based on the peripheral information, whether the own vehicle is positioned in a parking area (PA) including a parking spot row (PSA) having a plurality of parking spots (PS) arranged in parallel and an erroneous operation determination function of determining, based on the operation information, whether an erroneous depression operation is executed on an accelerator pedal (AP) of the own vehicle, and further has an acceleration suppression function of suppressing acceleration of the own vehicle when the own vehicle is determined to be positioned in the parking area and the erroneous depression operation is determined to be executed on the accelerator pedal.

The control device is configured to: predict, when a speed (vs) of the own vehicle is equal to or higher than a predetermined speed (vsth), a trajectory (T) of the own vehicle in a case in which the own vehicle travels; further predict a time (Δt) required for the own vehicle to reach a point (X) at which the trajectory and the parking spot row intersect with each other; determine that the own vehicle is positioned in the parking area when the predicted time is equal to or shorter than a predetermined time (Δtth); and determine, when the speed of the own vehicle is lower than the predetermined speed or the own vehicle is stopped, that the own vehicle is positioned in the parking area in a case in which a determination target region (A0) being a region having a predetermined length and the parking spot row overlap each other. The determination target region extends from the own vehicle toward a possible traveling direction of the own vehicle, and is defined in accordance with a turning angle (θ) of the own vehicle. As used herein, the possible traveling direction of the own vehicle is a traveling direction of the own vehicle in a case in which the own vehicle is traveling forward. The possible traveling direction is a direction toward which the own vehicle highly possibly travels when the own vehicle travels from a stopped position in a case in which the own vehicle is stopped.

In the driving support device according to the at least one embodiment of the present invention, a scene in which the control device can execute the acceleration suppression control is limited to a scene in which the driving operation for the parking is executed. That is, when the control device determines that the own vehicle is positioned in the parking area, the control device can execute the acceleration suppression control. Otherwise, the control device does not suppress the acceleration of the own vehicle. Thus, when the own vehicle is positioned outside the parking area, the acceleration of the own vehicle is controlled exactly as the depression operation of the accelerator pedal is executed. Specifically, the control device sets the determination target region which extends from a front end of the own vehicle toward the possible traveling direction when, for example, the own vehicle is traveling at a low speed, that is, a speed of the own vehicle is lower than a predetermined speed, or the own vehicle is stopped. The control device determines that the own vehicle is positioned in the parking area when this determination target region and the parking spot row overlap each other. Thus, when the possible traveling direction of the own vehicle and a direction in which the parking spot row exists are different from each other, the determination target region and the parking spot row do not overlap each other. As a result, it is estimated that the current situation is not the situation in which the driving operation for the parking is executed, and hence the acceleration of the own vehicle is allowed (is not suppressed). Thus, according to the at least one embodiment of the present invention, it is possible to reduce the sense of discomfort of the driver by reducing the acceleration suppression unnecessary for the driver.

In the driving support device according to one aspect of the present invention, the determination target region is a region through which the own vehicle passes when the own vehicle moves forward under a state in which a current turning angle of the own vehicle is maintained.

With this configuration, the control device can relatively easily define the determination target region.

Moreover, a driving support method and a driving support program according to at least one embodiment of the present invention include steps executed by each device forming the above-mentioned driving support device.

DESCRIPTION OF THE EMBODIMENTS

Figure 1:
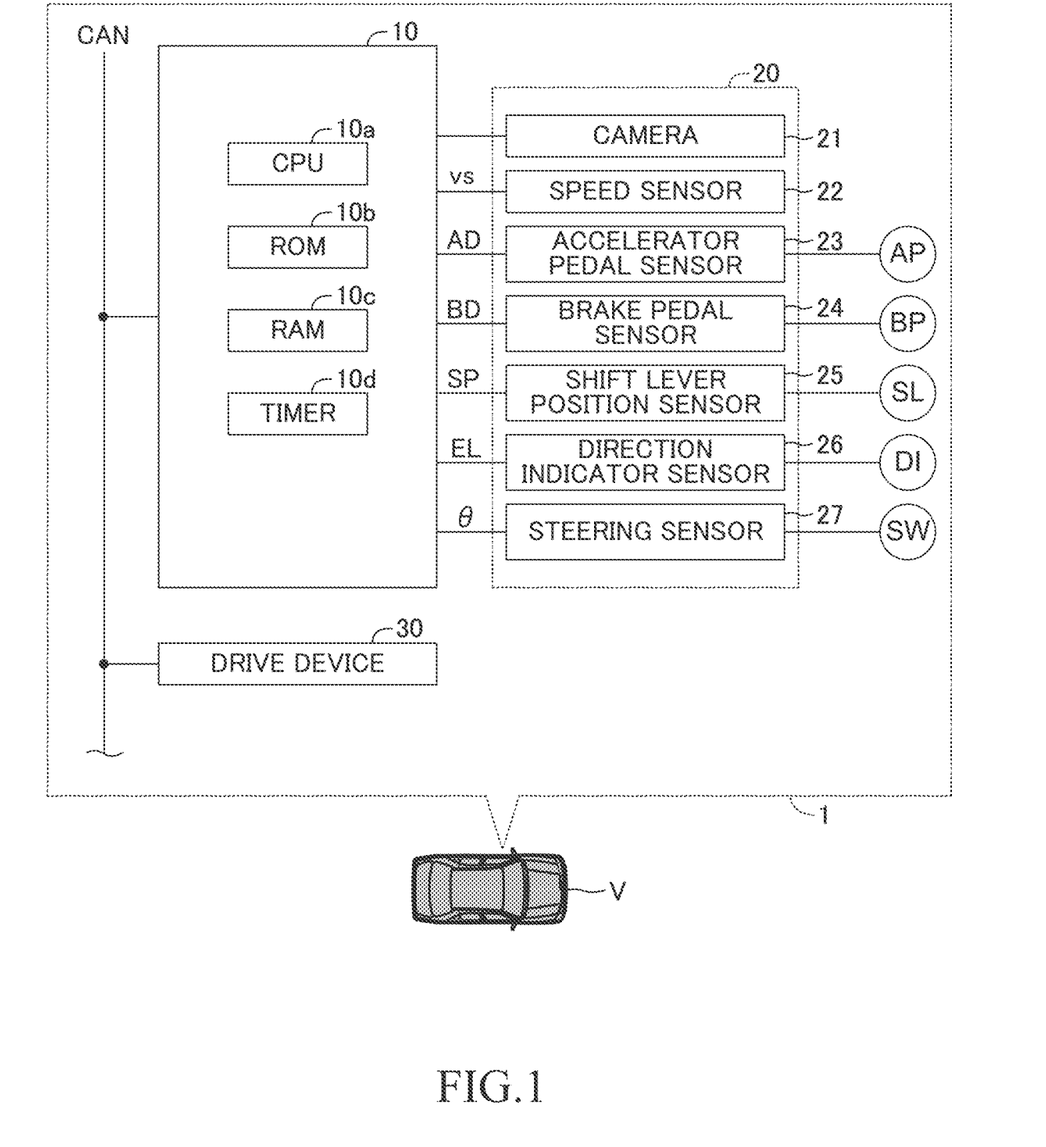
FIG. 1 is a block diagram of a driving support device according to at least one embodiment of the present invention.

As illustrated in FIG. 1, a driving support device 1 according to at least one embodiment of the present invention is mounted to a vehicle V (hereinafter referred to as "own vehicle") having a self-driving function. The driving support device 1 has a function (acceleration suppression function) of suppressing acceleration of the own vehicle when a driver has highly possibly erroneously depressed an accelerator pedal AP under a situation in which the self-driving function is disabled and the driver is initiatively executing a driving operation.

As illustrated in FIG. 1, the driving support device 1 includes a driving support ECU 10, in-vehicle sensors 20, and a drive device 30.

The driving support ECU 10 (control device) includes a microcomputer including, for example, a CPU 10a, a ROM 10b, a RAM 10c, and a timer 10d. The driving support ECU 10 is connected to other ECUs (for example, an ECU of the drive device 30 which is described later) via a controller area network (CAN).

The in-vehicle sensors 20 include a sensor (periphery sensor) which acquires information on target objects existing in a periphery of the own vehicle. Specifically, the in-vehicle sensors 20 include a camera 21 as the periphery sensor.

The camera 21 includes an image pickup device and an image analysis device. The image pickup device is, for example, a digital camera having a built-in image pickup element being a charge-coupled device (CCD) or a CMOS image sensor (CIS). The image pickup device faces forward in the front portion of the own vehicle. The image pickup device captures each peripheral region of the own vehicle at a predetermined frame rate to acquire image data. The image pickup device transmits each piece of image data to the image analysis device. The image analysis device analyzes the acquired image data, to thereby acquire, from images thereof, information on target objects existing around the own vehicle and information on frame lines, stop lines, and the like drawn on a road surface (ground) around the own vehicle. For example, the image analysis device recognizes frame lines PL which define a parking spot PS, and further calculates a position (direction, coordinates in plan view, and the like) of the parking spot PS with respect to the own vehicle, a distance from the own vehicle to the parking spot PS, and the like. The image analysis device transmits data representing the acquired information and results of the calculation to the driving support ECU 10.

The in-vehicle sensors 20 include a sensor (vehicle sensor) which acquires information on a travel state of the own vehicle and sensors (operation sensors) which acquire information on operations on a driving operation device (an accelerator pedal AP, a brake pedal BP, a shift lever SL, a direction indicator DI, a steering wheel SW, and the like) included in the own vehicle. Specifically, the in-vehicle sensors 20 include a speed sensor 22 as the vehicle sensor, and an accelerator pedal sensor 23, a brake pedal sensor 24, a shift lever position sensor 25, a direction indicator sensor 26, and a steering sensor 27 as the operation sensors.

The speed sensor 22 detects a speed vs of the own vehicle. The speed sensor 22 transmits data representing the speed vs to the driving support ECU 10. The accelerator pedal sensor 23 detects a depression depth AD of the accelerator pedal AP of the own vehicle. The accelerator pedal sensor 23 transmits data representing the depression depth AD to the driving support ECU 10. The brake pedal sensor 24 detects a depression depth BD of the brake pedal BP of the own vehicle. The brake pedal sensor 24 transmits data representing the depression depth BD to the driving support ECU 10.

The shift lever position sensor 25 detects a shift position SP (forward position (drive position), backward position (reverse position), and the like), which is the position of the shift lever SL of the own vehicle. The shift lever position sensor 25 transmits data representing the shift position SP to the driving support ECU 10.

The direction indicator sensor 26 detects a lighting state EL (right turn, left turn, or hazard) of the direction indicator DI of the own vehicle. The direction indicator sensor 26 transmits data representing the lighting state EL of the direction indicator DI to the driving support ECU 10.

The steering sensor 27 detects a steering angle (also referred to as "turning angle" or "steered angle") θ of the steering wheel SW of the own vehicle. The steering sensor 27 transmits data representing the detected steering angle θ to the driving support ECU 10.

The drive device 30 applies a driving force to driving wheels of wheels (left front wheel, right front wheel, left rear wheel, and right rear wheel). The drive device 30 includes an engine ECU, an internal combustion engine, a transmission, a driving force transmission mechanism which transmits the driving force to the wheels, and the like. The internal combustion engine includes an actuator which drives a throttle valve. The engine ECU acquires information (control signal) representing a target driving force from another ECU (driving support ECU 10), and drives actuators of the internal combustion engine based on this information. Thus, the driving force to be applied to the driving wheels (acceleration of the own vehicle) is controlled. The driving force generated by the internal combustion engine is transmitted to the driving wheels via the transmission and the driving force transmission mechanism. Moreover, the engine ECU acquires information (control signal) relating to a shift position of the transmission from another ECU, and drives actuators of the transmission based on this information. Thus, the shift position of the transmission is controlled.

When the vehicle V to which the driving support device 1 is applied is a hybrid electric vehicle (HEV), the engine ECU can control a driving force of the vehicle generated by any one of or both of "an internal combustion engine and an electric motor" serving as vehicle driving sources. Moreover, when the vehicle V to which the driving support device 1 is applied is a battery electric vehicle (BEV), it is only required to use, in place of the engine ECU, a motor ECU which controls a driving force of the vehicle generated by "an electric motor" serving as a vehicle driving source.

The driving support ECU 10 monitors the depression depth AD of the accelerator pedal AP based on the data acquired from the accelerator pedal sensor 23. Moreover, the driving support ECU 10 acquires the depression depth BD of the brake pedal BP from the brake pedal sensor 24, and acquires the lighting state EL of the direction indicator DI from the direction indicator sensor 26. After that, the driving support ECU 10 determines whether or not the accelerator pedal AP is erroneously depressed based on the depression depth AD, an increase rate ADR of the depression depth AD, the depression depth BD, the lighting state EL, and the like. Specifically, the driving support ECU 10 determines that an erroneous depression operation is executed on the accelerator pedal AP when all of the following condition 1 to condition 4 are satisfied.

[Condition 1] The increase rate ADR of the depression depth AD exceeds a threshold value ADRth.
[Condition 2] The depression depth AD exceeds a threshold value ADth0.
[Condition 3] The direction indicator DI is not operating (is turned off).
[Condition 4] A predetermined time has elapsed since the depression operation on the brake pedal BP was canceled.

When the driving support ECU 10 determines that the accelerator pedal AP is erroneously depressed, the driving support ECU 10 executes acceleration suppression control of suppressing the acceleration of the own vehicle. That is, in this case, the driving support ECU 10 does not increase an opening degree of the throttle valve of the drive device 30.

However, in a case in which the shift position of the own vehicle is the forward position, the driving support ECU 10 executes the acceleration suppression control only when the driving support ECU 10 determines that the own vehicle is positioned in a parking area PA and determines that the accelerator pedal AP is erroneously depressed as described below. That is, in the case in which the shift position SP is the forward position, the driving support ECU 10 can execute the acceleration suppression control only when the driver highly possibly executes a driving operation for the parking, and cannot execute the acceleration suppression control in a normal travel state. When the shift position SP of the own vehicle is the backward position, the driving support ECU 10 can execute the acceleration suppression control irrespective of whether or not the own vehicle is positioned in a parking area PA.

The parking area PA is a region including a parking spot row PSA having a plurality of parking spots PS arranged in parallel, and is a region in which the driver highly possibly executes the driving operation for parking the own vehicle in one parking spot PS. The driving support ECU 10 determines whether or not the own vehicle is positioned in a parking area PA as described below.

The driving support ECU 10 sequentially acquires, from the camera 21, data representing information on frame lines drawn on a road surface (ground) around the own vehicle when the shift position SP is the forward position. The driving support ECU 10 determines whether or not a parking spot row PSA exists in front of the own vehicle based on the acquired data. For example, the driving support ECU 10 acquires, from the camera 21, a recognition result of frame lines PL (coordinates of the frame lines PL) of parking spots PS drawn on the ground. Moreover, when a plurality of frame lines PL are arranged in parallel in an extending direction of short sides of the frame lines PL, the driving support ECU 10 determines that a parking spot row PSA exists in front of the own vehicle.

When the driving support ECU 10 determines that a parking spot row PSA exists in front of the own vehicle, the parking support ECU 10 acquires the data representing the speed vs of the own vehicle and representing the steering angle θ from the speed sensor 22 and the steering sensor 27, respectively.

Figure 2A:
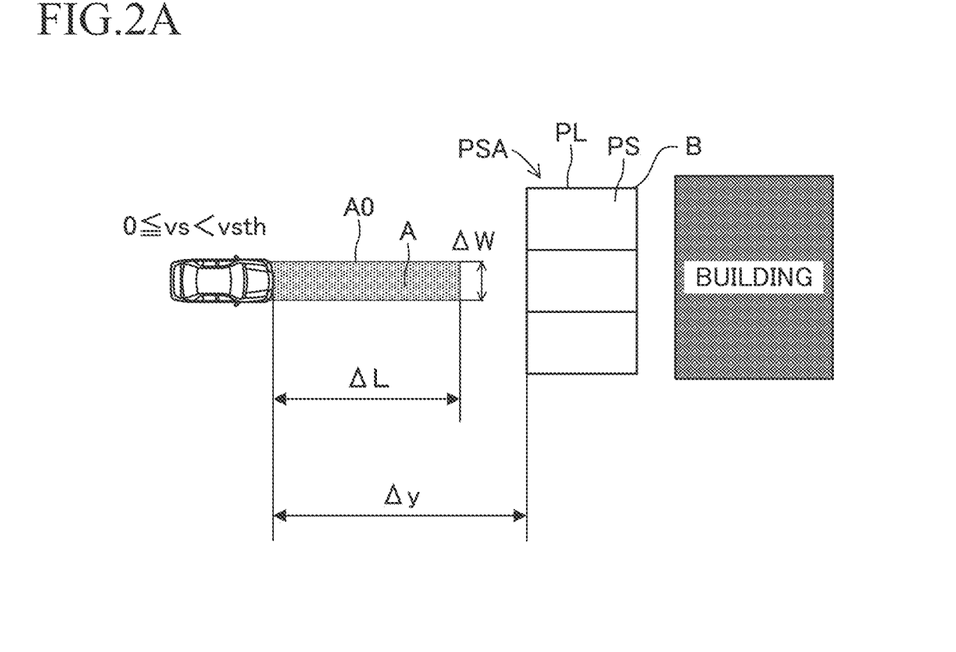
FIG. 2A is a plan view for illustrating a situation in which an own vehicle travels straight and a determination target region and a parking spot row do not overlap each other.
Figure 3A:
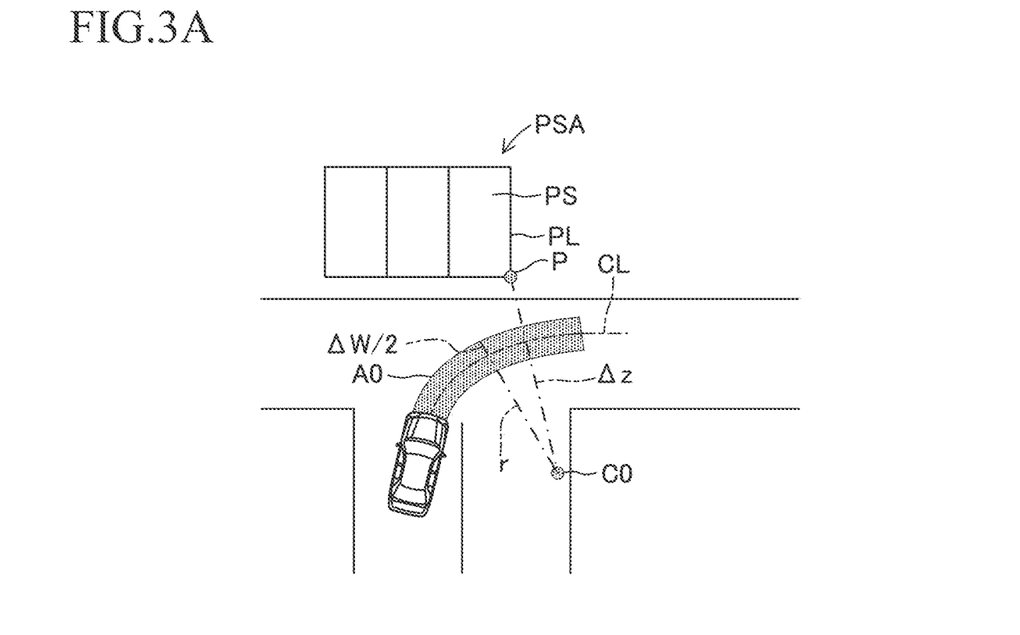
FIG. 3A is a plan view for illustrating an example of the determination target region at the time when the own vehicle is steered to turn.

The driving support ECU 10 determines whether or not the speed vs is lower than a threshold value vsth based on the data acquired from the speed sensor 22 and the steering sensor 27. When the driving support ECU 10 determines that the speed vs is lower than the threshold value vsth, the driving support ECU 10 sets a determination target region A0 used to determine whether or not the own vehicle is positioned in a parking area PA as illustrated in FIG. 2A and FIG. 3A. The determination target region A0 is a region having a predetermined length and extending from a front end of the own vehicle toward a possible traveling direction of the own vehicle, and is a region presenting a strip shape defined in accordance with the turning angle θ (steering angle θ) of the own vehicle. As used herein, the possible traveling direction is a direction toward which the own vehicle travels while the current turning angle θ is maintained when the own vehicle is slowly traveling at a speed vs lower than the threshold value vsth. The possible traveling direction is a direction toward which the own vehicle highly possibly travels in a case in which the own vehicle travels forward while the current turning angle θ is maintained when the own vehicle is stopped. Moreover, a width £W (dimension in a strip width direction) of the determination target region A0 is the same as, for example, a width (vehicle width) of a front end portion of the own vehicle. A length ΔL of the determination target region A0 is, for example, about twice of an overall length of the own vehicle. When the turning angle θ is "0°," the determination target region A0 presents a linear shape (see FIG. 2A). When the turning angle θ is other than "0°" (that is, when the own vehicle is steered to turn toward the left direction or the right direction), the determination target region A0 presents a substantial arc shape (see FIG. 3A). Specifically, when the turning angle θ is other than "0°," the determination target region A0 corresponds to a region through which the front end of the own vehicle passes when the own vehicle travels while the turning angle θ is maintained. That is, a curvature of the determination target region A0 is determined in accordance with the turning angle θ. The length ΔL at the time when the determination target region A0 is curved corresponds to a length along a center line CL passing through a center portion of the determination target region A0 in the width direction. The threshold value vsth of the speed vs is set in advance to a value lower than an upper limit value (for example, about half of the upper limit value) of a speed at which the own vehicle is moved by the driver to park the own vehicle in a parking spot PS. As the threshold value vsth, for example, 10 km/h can be exemplified.

The driving support ECU 10 determines that the own vehicle is positioned in a parking area PA when the determination target region A0 and the parking spot row PSA overlap each other.

Figure 2B:
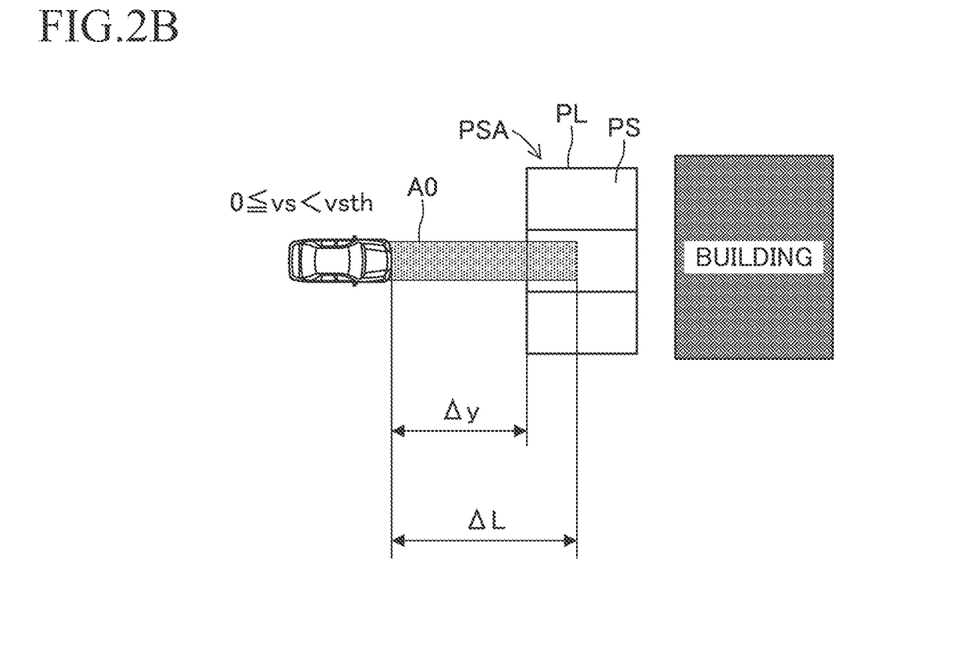
FIG. 2B is a plan view for illustrating a situation in which the own vehicle travels straight and the determination target region and the parking spot row overlap each other.

For example, as illustrated in FIG. 2A, in a situation in which the own vehicle is traveling straight at a speed vs lower than the threshold value vsth toward a parking spot row PSA (in the situation in which the turning angle θ is "0°") or in a situation in which the own vehicle is facing a parking spot row PSA and is stopped under the state in which the turning angle θ is "0°," the driving support ECU 10 acquires, from the camera 21, a distance Δy from the front end of the own vehicle to the closest side of the parking spot row PSA. When the distance Δy is longer than the length ΔL of the determination target region A0, the driving support ECU 10 determines that the determination target region A0 and the parking spot row PSA do not overlap each other. That is, in this case, the driving support ECU 10 determines that the own vehicle is positioned outside a parking area PA. Meanwhile, as illustrated in FIG. 2B, when the distance Δy is equal to or shorter than the length ΔL, the driving support ECU 10 determines that the determination target region A0 and the parking spot row PSA overlap each other.

Moreover, for example, as illustrated in FIG. 3A, in a situation in which the own vehicle turns (turns right or turns left) at a speed vs lower than the threshold value vsth before a parking spot row PSA, the driving support ECU 10 calculates coordinates of a turning center C0 and a turning radius "r" of the own vehicle in plan view based on the turning angle θ. Further, the driving support ECU 10 calculates a distance Δz between the turning center C0 and the closest point P among points of the frame lines PL of the parking spot row PSA. When the distance Δz is longer than a radius R of an outer peripheral edge portion of the determination target region A0 (a sum of the turning radius "r" and a value of ½ of the width £W (=r+ΔW/2)), the driving support ECU 10 determines that the determination target region A0 and the parking spot row PSA do not overlap each other. That is, in this case, the driving support ECU 10 determines that the own vehicle is positioned outside a parking area PA. In this situation, even when the driver erroneously depresses the accelerator pedal AP, the driving support ECU 10 does not execute the acceleration suppression control. Meanwhile, when the distance Δz is equal to or shorter than half of the radius R, the driving support ECU 10 determines that the determination target region A0 and the parking spot row PSA overlap each other. In this situation, when the driving support ECU 10 determines that the driver has erroneously depressed the accelerator pedal AP, the driving support ECU 10 executes the acceleration suppression control.

Figure 3B:
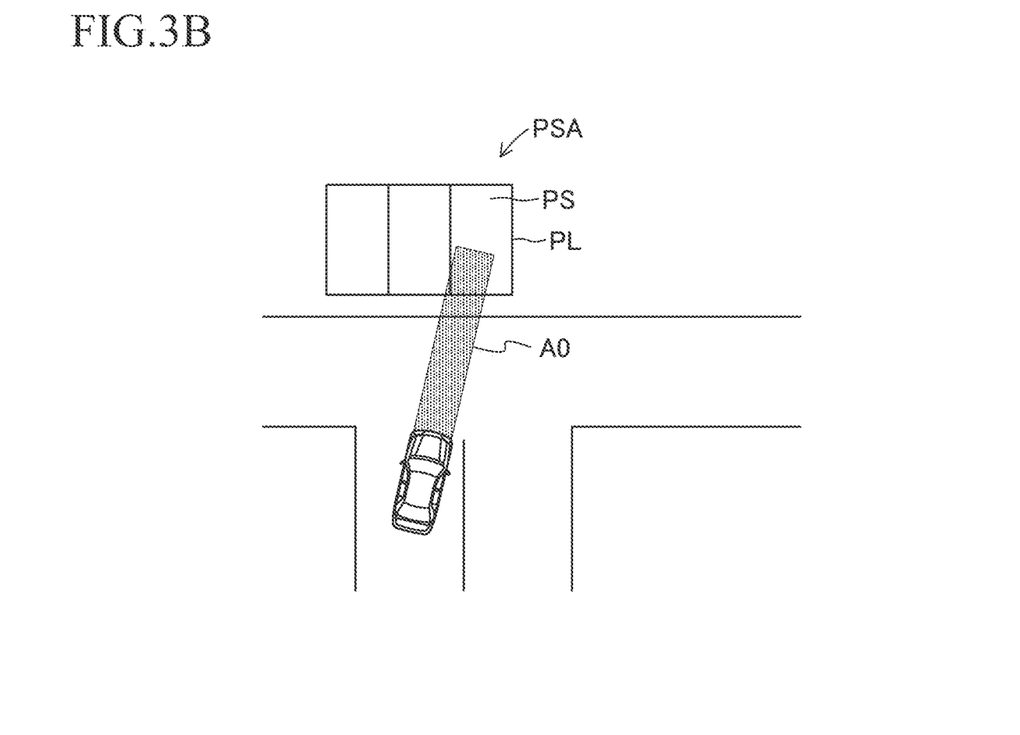
FIG. 3B is a plan view for illustrating an example in which, when the own vehicle is steered to turn, a determination target region linearly extending toward a front side of the own vehicle is set.

In a case in which the determination target region A0 is set such that the determination target region A0 linearly extends toward the front side regardless of the turning angle θ of the own vehicle, when the own vehicle turns in a vicinity of the parking spot row PSA as illustrated in FIG. 3B, the determination target region A0 and the parking spot row PSA highly possibly overlap each other. That is, there is a fear that, even when the driver does not intend to park the own vehicle in the parking spot PS, it may be determined that the own vehicle is positioned in a parking area PA, and the acceleration of the own vehicle may be suppressed. In contrast, in the at least one embodiment, as illustrated in FIG. 3A, when the own vehicle is steered to turn the own vehicle, the determination target region A0 is defined such that the determination target region A0 presents an arc shape. Moreover, the curvature of that determination target region A0 is defined in accordance with the turning radius "r." Thus, compared with the example of FIG. 3B, the determination target region A0 and the parking spot row PSA are less likely to overlap each other, and hence the acceleration of the own vehicle is less likely to be suppressed.

Figure 4:
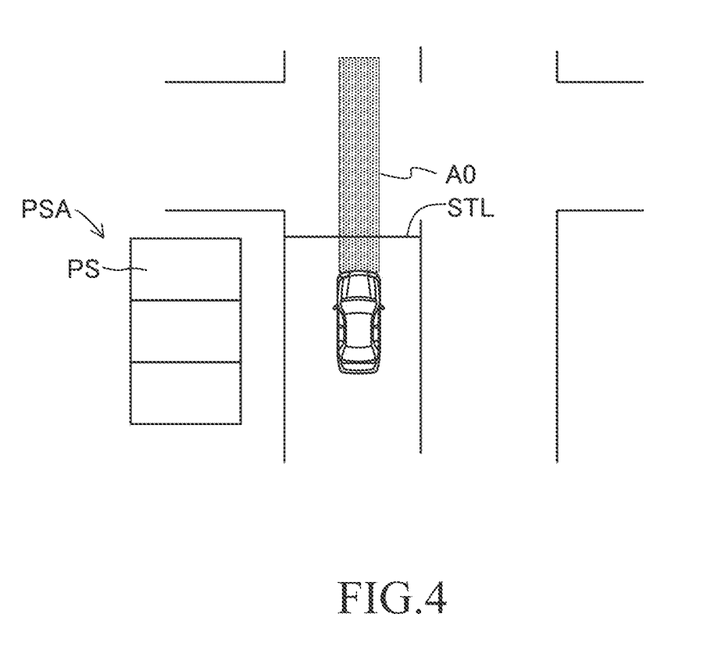
FIG. 4 is a plan view for illustrating another example of the determination target region.

Moreover, for example, as illustrated in FIG. 4, in a state in which an intersection exists in an immediate vicinity of a parking spot row PSA, and the own vehicle is stopped before a stop line STL (immediately in front of the parking spot row PSA) just before the own vehicle enters this intersection, the determination target region A0 does not overlap the parking spot row PSA. Thus, even when the driver greatly depresses the accelerator pedal AP in order to start the own vehicle, the driving support ECU 10 does not execute the acceleration suppression control. That is, a start operation (acceleration) of the own vehicle is not interfered with.

Figure 5:
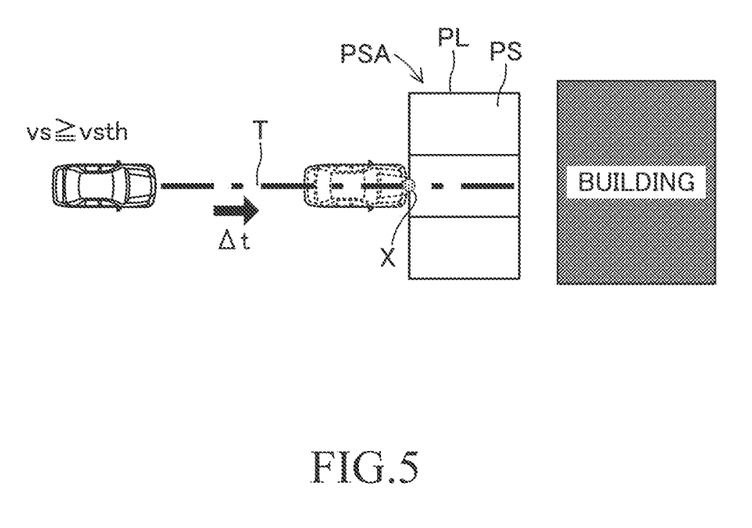
FIG. 5 is a plan view for illustrating an example of a predicted trajectory of the own vehicle.

When the speed vs is equal to or higher than the threshold value vsth, which is different from the above-mentioned example, the driving support ECU 10 estimates (calculates) a predicted trajectory T (for example, a line which connects points through which the center portion of the front end portion of the own vehicle in the vehicle width direction passes to each other) of the own vehicle when the own vehicle travels under the state in which the current steering angle θ is maintained, as illustrated in FIG. 5. After that, the driving support ECU 10 calculates a position (coordinates) of an intersection X between the predicted trajectory T and the parking spot row PSA (frame line PL) in plan view. Further, the driving support ECU 10 calculates a time Δt (=(distance of travel of the own vehicle to the intersection X along the predicted trajectory T)/(speed vs)) required for the front end of the own vehicle to reach the intersection X based on the speed vs. When the time Δt is equal to or shorter than a threshold value Δtth, the driving support ECU 10 determines that the own vehicle is positioned in a parking area PA. Meanwhile, when the time Δt exceeds the threshold value Δtth, the driving support ECU 10 determines that the own vehicle is positioned outside a parking area PA. When the predicted trajectory T and the parking spot row PSA do not intersect with each other, the time Δt is infinite (maximum). In this case, the driving support ECU 10 determines that the own vehicle is positioned outside a parking area PA. The threshold value Δtth is set such that the threshold value Δtth is equivalent to as a time required to travel a distance twice of the length ΔL at a speed vs equivalent to an upper limit value of a speed for the driver to move the own vehicle to a parking spot PS in order to park the own vehicle in the parking spot PS. As the threshold value Δtth, for example, three seconds can be exemplified.

In a case in which the predicted trajectory T and the time Δt are calculated even when the speed vs is lower than the threshold value vsth, and it is determined whether or not the own vehicle is positioned in a parking area PA based on the results of the calculation, the speed vs is relatively low, and hence the time Δt highly possibly exceeds the threshold value Δtth. For example, when the own vehicle is stopped immediately before a parking spot row PSA, the time Δt is infinite (maximum). In this case, it is determined that the own vehicle is positioned outside the parking area PA, and hence the acceleration of the own vehicle is not suppressed. Thus, in the at least one embodiment, when the speed vs is lower than the threshold value vsth, it is determined whether or not the own vehicle is positioned in a parking area PA based on whether or not the determination target region A0 and a parking spot row PSA overlap each other.

Figure 6:
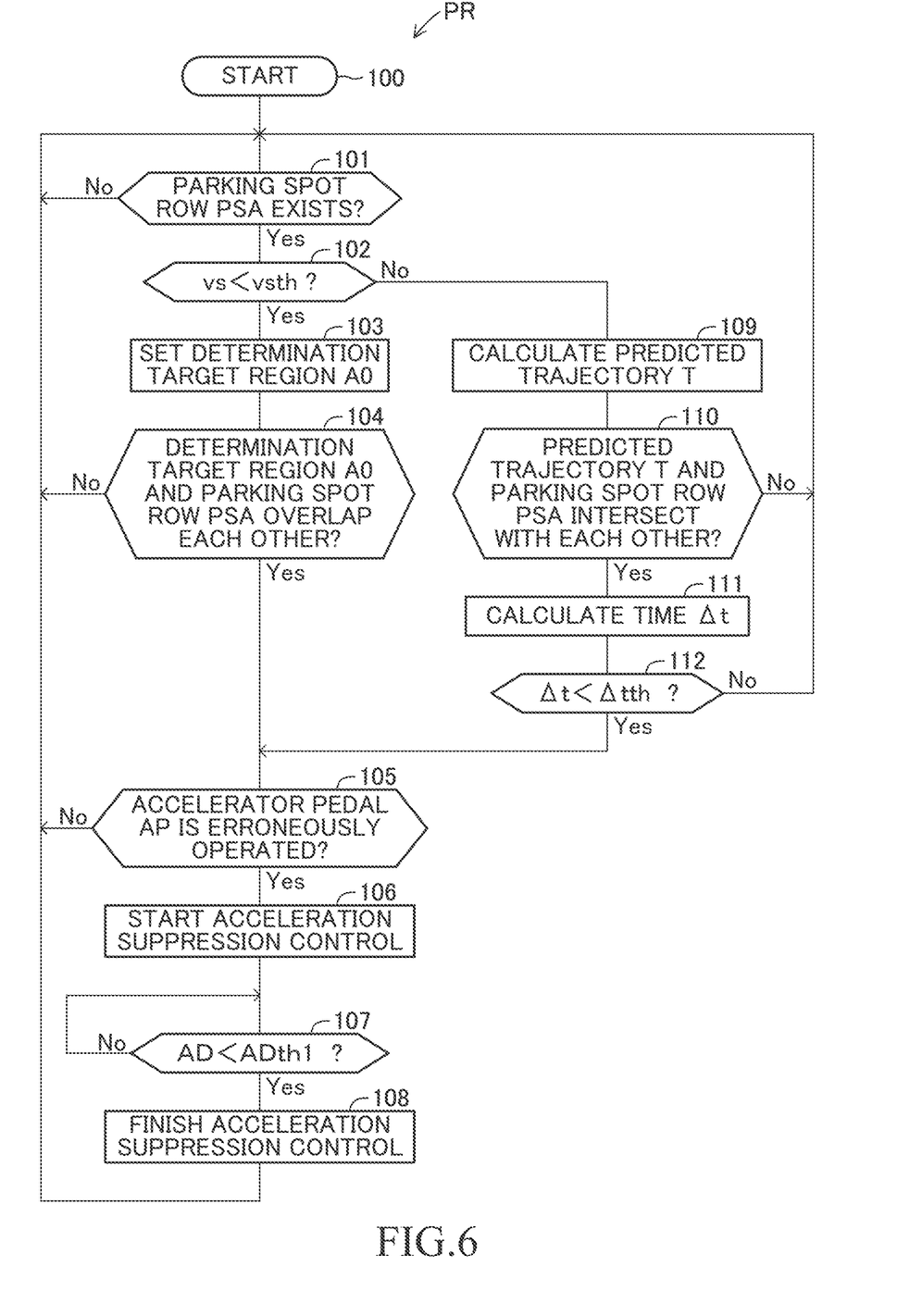
FIG. 6 is a flowchart of a program for implementing an acceleration suppression function.

With reference to FIG. 6, a specific description is now given of an operation (program PR for implementing the acceleration suppression function) of the driving support ECU 10 (hereinafter simply referred to as "CPU").

The CPU starts execution of the program PR from Step 100 when the shift position SP of the own vehicle is the forward position, and advances the process to Step 101.

In Step 101, the CPU determines whether or not a parking spot row PSA exists in front of the own vehicle based on the data acquired from the camera 21. When a parking spot row PSA exists (Yes in Step 101), the CPU advances the process to Step 102. Meanwhile, when a parking spot row PSA does not exist (No in Step 101), the CPU returns the process to Step 101.

In Step 102, the CPU determines whether or not the speed vs of the own vehicle is lower than the threshold value vsth based on the data acquired from the speed sensor 22. When the speed vs is lower than the threshold value vsth (Yes in Step 102), the CPU advances the process to Step 103. Meanwhile, when the speed vs is equal to or higher than the threshold value vsth (No in Step 102), the CPU advances the process to Step 109 described later.

In Step 103, the CPU acquires the turning angle θ based on the data acquired from the steering sensor 27, and sets the determination target region A0 (see FIG. 2A and FIG. 3A) based on this turning angle θ. After that, the CPU advances the process to Step 104.

In Step 104, the CPU determines whether or not the determination target region A0 and the parking spot row PSA overlap each other. For example, the CPU compares a coordinate group A in the determination target region A0 and a coordinate group B of the frame lines PL forming the parking spot row PSA with each other in a plane coordinate system, to thereby determine whether or not matching coordinates exist. When matching coordinates exist, the CPU determines that the determination target region A0 and the parking spot row PSA overlap each other. When matching coordinates do not exist, the CPU determines that the determination target region A0 and the parking spot row PSA do not overlap each other. When the determination target region A0 and the parking spot row PSA overlap each other (Yes in Step 104), the CPU advances the process to Step 105. Meanwhile, when the determination target region A0 and the parking spot row PSA do not overlap each other (No in Step 104), the CPU returns the process to Step 101.

In Step 105, the CPU determines whether or not the accelerator pedal AP is erroneously operated (whether or not the accelerator pedal AP is erroneously depressed). When the CPU determines that the accelerator pedal AP is erroneously operated (Yes in Step 105), the CPU advances the process to Step 106. Meanwhile, when the CPU does not determine that the accelerator pedal AP is erroneously depressed (No in Step 105), the CPU returns the process to Step 101.

In Step 106, the CPU starts the acceleration suppression control. That is, the CPU controls the drive device 30 (suppresses the acceleration of the own vehicle) such that the opening degree of the throttle valve does not increase. After that, the CPU advances the process to Step 107.

In Step 107, the CPU determines whether or not the depression depth AD of the accelerator pedal AP is smaller than a threshold value ADth1 smaller than a threshold value ADth0. When the depression depth AD is smaller than the threshold value ADth1 (Yes in Step 107), the CPU advances the process to Step 108. Meanwhile, when the depression depth AD is equal to or larger than the threshold value ADth1, the CPU returns the process to Step 107. That is, the increase in the opening degree of the throttle valve is inhibited until a depression force applied to the accelerator pedal AP is reduced and the depression depth AD consequently becomes smaller to a certain degree. The decrease in the opening degree of the throttle valve is allowed.

In Step 108, the CPU finishes the acceleration suppression control (cancels the acceleration suppression). After that, the CPU returns the process to Step 101.

Moreover, when the process is advanced from Step 102 to Step 109, the CPU calculates the predicted trajectory T (see FIG. 5). After that, the CPU advances the process to Step 110.

In Step 110, the CPU determines whether or not the predicted trajectory T and the parking spot row PSA intersect with each other. In this case, the CPU determines, for example, whether or not an intersection between the predicted trajectory T and each of frame lines PL which define a parking spot PS of the parking spot row PSA exists in the plane coordinate system. When the predicted trajectory T and the parking spot row PSA intersect with each other (Yes in Step 110), the CPU advances the process to Step 111. Meanwhile, when the predicted trajectory T and the parking spot row PSA do not intersect with each other (No in Step 110), the CPU returns the process to Step 101.

In Step 111, the CPU determines, as the intersection X, an intersection having the shortest distance from the own vehicle among the intersections between the predicted trajectory T and the parking spot row PSA. The CPU further calculates the time Δt required to reach the intersection X between the predicted trajectory T and the parking spot row PSA based on the current speed vs and the distance to the intersection X. After that, the CPU advances the process to Step 112.

In Step 112, the CPU determines whether or not the time Δt is shorter than the threshold value Δtth. When the time Δt is shorter than the threshold value Δtth (Yes in Step 112), the CPU advances the process to Step 105. Meanwhile, when the time Δt is equal to or longer than the threshold value Δtth, the CPU returns the process to Step 101.

(Effects)

According to the at least one embodiment, the driving support ECU 10 sets the determination target region A0 extending from the front end of the own vehicle toward the possible traveling direction when the own vehicle is traveling at a low speed (vs<vsth) or is stopped, and determines that the own vehicle is positioned in a parking area PA when this determination target region A0 and a parking spot row PSA overlap each other. Thus, when the possible traveling direction of the own vehicle and a direction in which the parking spot row exists are different from each other, the determination target region A0 and the parking spot row PSA do not overlap each other (see FIG. 4). As a result, it is estimated that the current situation is not the situation in which the driving operation for the parking is to be executed, and hence the acceleration of the own vehicle is allowed (is not suppressed). Thus, according to the at least one embodiment, it is possible to reduce the sense of discomfort of the driver by reducing the acceleration suppression unnecessary for the driver.

The present invention is not limited to the at least one embodiment described above, and various modification examples can be adopted within the scope of the present invention.

Modification Example 1

When the speed vs is lower than the threshold value vsth, and the own vehicle is steered to turn, the driving support ECU 10 may set a determination target region A0 having a predetermined length and extending linearly from the front end of the own vehicle toward a diagonally front side (steering direction). In this case, it is preferred that an angle between a center line passing through the center portion of the own vehicle in the width direction and the extending direction of the determination target region A0 be determined in accordance with the turning angle θ.

Other Modification Examples

The driving support ECU 10 may control a braking device of the own vehicle such that the own vehicle is not accelerated when the driving support ECU 10 determines that the own vehicle is positioned in a parking area PA, and determines that the driver has erroneously depressed the accelerator pedal AP.

The vehicle V may be an autonomous vehicle.

What is claimed is:

1. A driving support device, comprising:
   an operation sensor configured to acquire operation information that is information on an operation on a driving operation device included in an own vehicle;
   a vehicle sensor configured to acquire vehicle information that is information on a travel state of the own vehicle;
   a periphery sensor configured to acquire peripheral information that is information on a target object existing in a periphery of the own vehicle; and
   a control device which has a parking area determination function of determining, based on the peripheral information, whether the own vehicle is positioned in a parking area including a parking spot row having a plurality of parking spots arranged in parallel and an erroneous operation determination function of determining, based on the operation information, whether an erroneous depression operation is executed on an accelerator pedal of the own vehicle, and further has an acceleration suppression function of suppressing acceleration of the own vehicle when the own vehicle is determined to be positioned in the parking area and the erroneous depression operation is determined to be executed on the accelerator pedal,
   wherein the control device is configured to:
      predict, when a speed of the own vehicle is equal to or higher than a predetermined speed, a trajectory of the own vehicle in a case in which the own vehicle travels;
      further predict a time required for the own vehicle to reach a point at which the trajectory and the parking spot row intersect with each other;
      determine that the own vehicle is positioned in the parking area when the predicted time is equal to or shorter than a predetermined time; and
      determine, when the speed of the own vehicle is lower than the predetermined speed or the own vehicle is stopped, that the own vehicle is positioned in the parking area in a case in which a determination target region being a region having a predetermined length and the parking spot row overlap each other, the determination target region extending from the own vehicle toward a possible traveling direction of the own vehicle and being defined in accordance with a turning angle of the own vehicle.

2. The driving support device according to claim 1, wherein the determination target region is a region through which the own vehicle passes when the own vehicle moves forward under a state in which a current turning angle of the own vehicle is maintained.

3. A driving support method, comprising:
   acquiring operation information that is information on an operation on a driving operation device included in an own vehicle;
   acquiring vehicle information that is information on a travel state of the own vehicle;
   acquiring peripheral information that is information on a target object existing in a periphery of the own vehicle; and
   executing control including determining, based on the peripheral information, whether the own vehicle is positioned in a parking area including a parking spot row having a plurality of parking spots arranged in parallel and determining, based on the operation information, whether an erroneous depression operation is executed on an accelerator pedal of the own vehicle, and further including suppressing acceleration of the own vehicle when the own vehicle is determined to be positioned in the parking area and the erroneous depression operation is determined to be executed on the accelerator pedal,
   wherein the executing control includes:
      predicting, when a speed of the own vehicle is equal to or higher than a predetermined speed, a trajectory of the own vehicle in a case in which the own vehicle travels, further predicting a time required for the own vehicle to reach a point at which the trajectory and the parking spot row intersect with each other, and determining that the own vehicle is positioned in the parking area when the predicted time is equal to or shorter than a predetermined time; and
      determining, when the speed of the own vehicle is lower than the predetermined speed or the own vehicle is stopped, that the own vehicle is positioned in the parking area in a case in which a determination target region and the parking spot row overlap each other, the determination target region being a predetermined region extending from the own vehicle and being defined in accordance with a turning angle of the own vehicle.

4. A non-transitory storage medium storing a driving support program for causing a computer of an own vehicle to execute:
   acquiring operation information that is information on an operation on a driving operation device included in the own vehicle;
   acquiring vehicle information that is information on a travel state of the own vehicle;
   acquiring peripheral information that is information on a target object existing in a periphery of the own vehicle; and
   executing control including determining, based on the peripheral information, whether the own vehicle is positioned in a parking area including a parking spot row having a plurality of parking spots arranged in parallel and determining, based on the operation information, whether an erroneous depression operation is executed on an accelerator pedal of the own vehicle, and further including suppressing acceleration of the own vehicle when the own vehicle is determined to be positioned in the parking area and the erroneous depression operation is determined to be executed on the accelerator pedal, wherein the executing control includes:
- predicting, when a speed of the own vehicle is equal to or higher than a predetermined speed, a trajectory of the own vehicle in a case in which the own vehicle travels, further predicting a time required for the own vehicle to reach a point at which the trajectory and the parking spot row intersect with each other, and determining that the own vehicle is positioned in the parking area when the predicted time is equal to or shorter than a predetermined time; and
- determining, when the speed of the own vehicle is lower than the predetermined speed or the own vehicle is stopped, that the own vehicle is positioned in the parking area in a case in which a determination target region and the parking spot row overlap each other, the determination target region being a predetermined region extending from the own vehicle and being defined in accordance with a turning angle of the own vehicle.

* * * * *